March 25, 1947.  A. GEIGER  2,417,978
SMOKING PIPE
Filed July 21, 1943
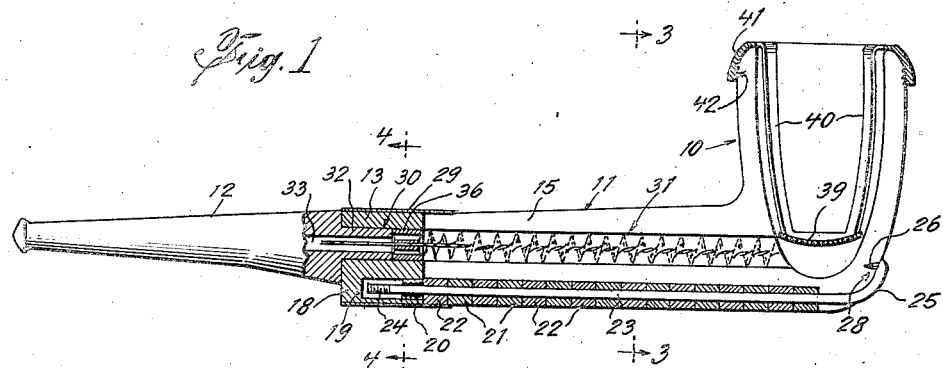
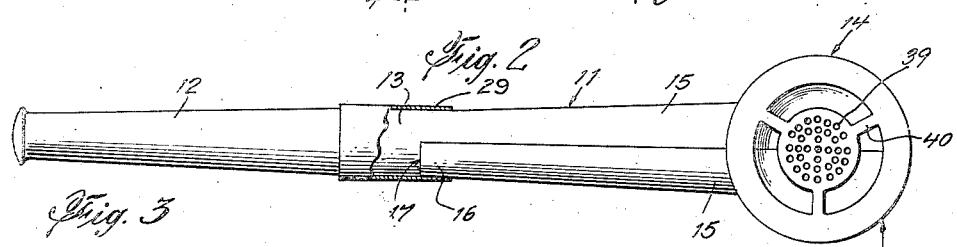
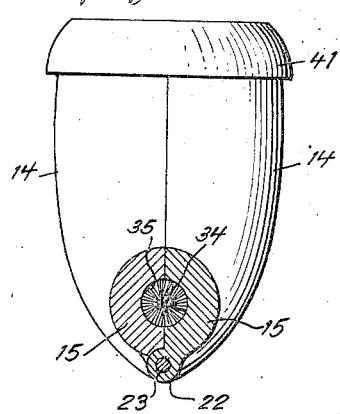
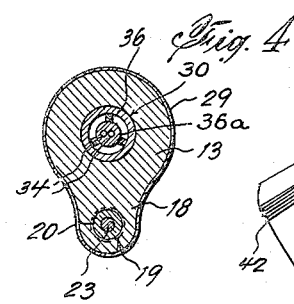
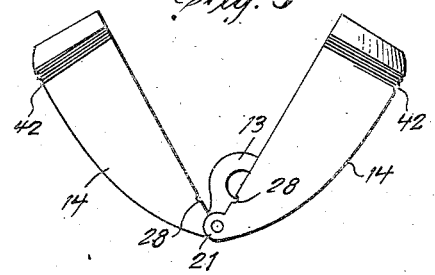
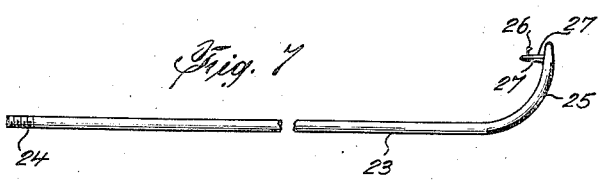
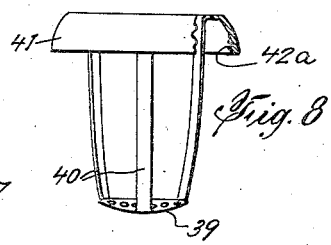
INVENTOR.
A. GEIGER
BY F. Ledermann
ATTORNEY Patented Mar. 25, 1947

2,417,978

UNITED STATES PATENT OFFICE 2,417,978

SMOKING PIPE

Aaron Geiger, Brooklyn, N. Y.

Application July 21, 1943, Serial No. 495,552

3 Claims. (Cl. 131—184)

This invention relates to smoking pipes, and aims to provide certain new and useful improvements to enhance the pleasure of smoking by providing means whereby the pipe may be thoroughly cleaned at will and as often as the user feels to be necessary, without the need for any accessories or instruments which are not provided on the pipe itself.

The above and other objects will become apparent in the description below, wherein characters of reference refer to like-numbered parts in the accompanying drawings which form a part hereof.

Referring briefly to the drawings,

Fig. 1 is a view of the pipe in vertical longitudinal cross-section, with parts shown in elevation.

Fig. 2 is a plan view of the pipe, with parts in section.

Fig. 3 is a cross-sectional view taken on the line 3—3 of Fig. 1.

Fig. 4 is a cross-sectional view taken on the line 4—4 of Fig. 1.

Fig. 5 is a front view of the pipe with the mutually hinged complementary sections thereof in separated position with the ring and hinge pin omitted.

Fig. 6 is a side view of the combined filter and cleaner member of the pipe.

Fig. 7 is a side view of the combined hinge pin member and scraper rod.

Fig. 8 is a side view, partly in section, of the combined bowl reinforcing ring and bowl grate.

Referring in detail to the drawings, the numeral 10 indicates the bowl of a pipe, whose shank is shown at 11 and whose stem is shown at 12. The outer end of the shank 11 is formed of a unitary cylindrical or conical tube or tubular section 13, and the remainder of the shank and bowl is split on a vertical longitudinal axial plane to provide a pair of complementary bowl and shank sections 14 and 15, respectively, each section 14—15 being unitary, the outer extremity 16 of the lower (Fig. 2) shank section 15 registering in the shoulder 17 of the tube section 13.

The tube 13 has a depending belly 18 formed integrally therewith through which a cylindrical recess 19 extends from the forward end thereof to a point near the rear end. A hollow tube or sleeve 20 is frictionally held in the forward portion of the recess 19, and is provided with internal screw threads, as shown. Hinge ears 21 extend from the lower edge of one section 14—15 and similar hinge ears 22 extend from the other section 14—15, and these are aligned axially, with the rod 23, when in position, providing the hinge pin on which all the hinges swing. To insert the rod 23, which is normally slidable for a limited distance in the hinge ear openings through which it passes, from left to right (Fig. 1), with the two sections 14—15 interengaged, the rear end of the rod is passed through the aligned hinge ear openings, and when it reaches the internal threads of the sleeve 20 the threaded extremity 24 thereof is screwed into and through the sleeve 20, and when the threaded extremity 24 has been screwed all the way through the sleeve 20 the rod is pushed the rest of the way home and releasably locked in that position in the manner later to be described. As the rod cannot be withdrawn without again screwing the end 24 through the sleeve 20 in the reverse direction, it is apparent that the rod will not fall out of the hinge ears, nor can it be pulled out.

The forward end 25 of the rod 23 is curved upward in conformity with the upward curvature of the pipe bowl, and projecting rearward from a point near the extremity of that end is a tapering pin 26 formed of a pair of complementary resilient half-sections 27 normally very slightly spread apart and adapted to be forced together. Formed in the mutually adjacent walls of the bowl sections 14 are two complementary tapering recesses 28 which form, when the sections are in closed position, a tapering recess into which the pin or prong 26 registers frictionally, thus locking the rod 23 in position against falling out in the forward direction. To remove the rod, it is first pulled forward to disengage the prong 26 from its said recess and then it is turned to unscrew its threaded end 24 from the sleeve 20.

A removable slidable locking sleeve 29 is normally positioned as shown in Figs. 1 and 2, the greater portion thereof surrounding the tubular portion 13. This sleeve 29 also has a depending belly surrounding and in close frictional contact with the belly 18. When in the position just mentioned, the sleeve 29 prevents separating of the sections 14—15 about their hinges, and it applies that restraining force at the rear end of the shank 11. To permit such unhinging of the pipe sections, the sleeve 29 is first slid to the left until it is clear of the nearest hinge ear 22.

The tubular portion 13 of the shank 11 has an axial opening 30 therethrough in alignment with the shank opening 31. The removable mouthpiece or bit 12 has a projecting tit 32, and the channel 33 through the bit and tit is of reduced diameter with respect to the opening 30; the front wall of the tit obviously provides an obstruction intermediate the length of the opening 30.

The combined filter and cleaner shown in Fig. 6 comprises a pair of twisted wires 34 formed into a single straight member, and locked therebetween in spiral formation are radially extending brush bristles 35. Near the rear end of the cleaner is a cylindrical coaxial sleeve 36 having a spider 36a therein as shown in Fig. 4, secured to the wire frame 34 of the brush by having the wires of the frame pass through the center member of the spider, with the frame 34 extending therebeyond as a finger grip 37. The cleaner is inserted into the channel 31 from the rear end thereof, to a position approximating that shown in Fig. 1, and then the bit 12 is put in place. The front wall of the tit 32 contacts with the sleeve 36 and holds the cleaner 38 in place. The extremity 37 thereof extends into the tit channel 33, and when the bit 12 is removed the extremity 37 may be grasped to pull out the cleaner 38.

It is apparent that with the cleaner or filter 38 in position as shown in Fig. 1, it will act as a filter to trap on its bristles the unsavory juices formed in the pipe and will prevent them from being drawn into the bit 12. When moved back and forth within the shank, with the bit removed, it will serve to clean the channel 31 free of such juices. It likewise prevents bits of tobacco from being drawn into the mouth.

The member shown in Fig. 8 comprises a perforated concave disk, or grate, 39, suspended from a plurality of blade-like bands 40 curved in conformity with the interior of the pipe bowl. When the bands are turned on an axis vertically through the bowl their leading edges will serve to scrape the bowl walls. A convex ring 41 provided with internal threads 42a is adapted to be screwed down on the closed pipe bowl 10 by engagement with the threads 42 at the top of the bowl, and the bands 40 depend integrally from this ring. The ring, when screwed home, tightens the two halves 14 of the bowl together. Thus, the assembled bowl, and pipe as a whole, when ready for use, is locked in the assembled position by both the sleeve 29 and the ring 41.

The cleaner 38 serves, as described, for ordinary cleaning of the pipe channel 31, and when removed it could also be passed through the channel 33 to clean the same, in the fashion of a pipe cleaner. In order to give the channel 31 a thorough cleaning on occasion, as well as exposure to the air for drying, the two sections 14—15 are separated by swinging on their hinges as above described, whence both halves of the channel 31 are exposed and readily accessible for thorough cleaning in any described manner. The hinge pin or rod 23 may also be removed, without disturbing the rest of the pipe, by pulling the rod forward a short distance, then unscrewing it as described, and pulling it completely out of the aligned hinge ears. The pipe will remain in compactly held-together condition by the sleeve 29 and ring 41 while the rod 23 is used to pry into the tobacco in the bowl to loosen it or for whatever other purposes such a pipe tool is useful. The act of screwing on the ring 41 will on each occasion cause the blade bands 40 to scrape the bowl as stated.

It is obvious from the above that a practical and clean smoking pipe has been provided, with the usual necessary accessories useful to clean or keep clean the pipe, included as parts of the pipe, so that they will always be immediately on hand.

Obviously, modifications in form and structure may be made without departing from the spirit and scope of the invention.

I claim:

1. In a smoking pipe comprising a bowl and shank portion and a removable bit portion, said bowl and shank portion being formed into two complementary half-sections, complementary hinge ears extending from said sections on the undersides thereof, a removable rod normally passing through said complementary hinge ears joining said sections in pivotal relationship, the forward end of said rod being curved upward, said bowl having a recess therein, and said forward end of said rod having a projection engageable in said recess.

2. In a smoking pipe comprising a bowl and shank portion and a removable bit portion, said bowl and shank portion being formed into two complementary half-sections hinged together on a longitudinal line along the undersides thereof, a removable threaded ring screwed on the upper end of said bowl having scraper bands rigid with and depending from said ring, a grate secured to the lower ends of said scraper bands and positioned above the bottom of said bowl.

3. In a smoking pipe comprising a bowl and shank portion and a removable bit portion, said bowl and shank portion being formed into two complementary half-sections, complementary hinge ears extending from said sections on the undersides thereof, a removable rod normally passing through said complementary hinge ears joining said sections in pivotal relationship, the rearward end of said shank having a belly formed on the underside thereof and having a cylindrical chamber therein in axial alignment with said rod, the rearward extremity of said rod being threaded, the forward end of said chamber having a wall provided with a threaded opening therethrough, said threaded end of said rod being adapted to be screwed through said threaded wall opening to releasably lock said rod against sliding forward out of said hinge ears.

AARON GEIGER.

REFERENCES CITED

The following references are of record in the file of this patent:

UNITED STATES PATENTS

| Number | Name | Date |
| --- | --- | --- |
| 2,048,411 | Schweinsberger | July 21, 1936 |
| 1,605,152 | Weber | Nov. 2, 1926 |
| 975,584 | Tait | Nov. 15, 1910 |
| 642,445 | Haugh | Jan. 30, 1900 |
| 1,554,537 | Teigen | Sept. 22, 1925 |
| 632,565 | Hall | Sept. 5, 1899 |
| 56,795 | Petty | July 31, 1866 |

FOREIGN PATENTS

| Number | Country | Date |
| --- | --- | --- |
| 120,794 | England | 1918 |
| 435,506 | England | Sept. 23, 1935 |
| 3,230 | England | 1874 |
| 24,253 | England | 1904 |
| 496,685 | England | Dec. 5, 1938 |
| 26,508 | England | Dec. 4, 1903 |
| 361,380 | Italy | July 20, 1938 |